United States Patent
Sidiropoulos

[11] Patent Number: 5,953,901
[45] Date of Patent: Sep. 21, 1999

[54] MECHANICAL FUEL SHUT-OFF SYSTEM FOR A GAS TURBINE

[75] Inventor: Georgios Sidiropoulos, Berlin, Germany

[73] Assignee: BMW Rolls-Royce GmbH, Oberursel, Germany

[21] Appl. No.: 08/952,455
[22] PCT Filed: May 31, 1995
[86] PCT No.: PCT/EP95/02082
§ 371 Date: Nov. 17, 1997
§ 102(e) Date: Nov. 17, 1997
[87] PCT Pub. No.: WO96/38655
PCT Pub. Date: Dec. 5, 1996
[51] Int. Cl.[6] .................................................. F02C 9/26
[52] U.S. Cl. ................................ 60/39.091; 60/734
[58] Field of Search ........................ 60/39.091, 223, 60/734; 24/509

[56] References Cited

U.S. PATENT DOCUMENTS

| | | | |
|---|---|---|---|
| 437,877 | 10/1890 | Traux | 24/509 |
| 2,476,635 | 7/1949 | Southwick | 24/509 |
| 2,930,188 | 3/1960 | Haworth et al. | 60/39.091 |
| 3,050,939 | 8/1962 | Morley. | |

FOREIGN PATENT DOCUMENTS

| | | |
|---|---|---|
| 2529619 | 1/1984 | France. |
| 25 20 874 | 12/1975 | Germany. |
| 903945 | 8/1962 | United Kingdom. |

*Primary Examiner*—Louis J. Casaregola
*Attorney, Agent, or Firm*—Evenson, McKeown, Edwards & Lenahan, P.L.L.C.

[57] ABSTRACT

The invention concerns a shut-off valve member which can be moved by spring force into a position in which it interrupts the fuel line to the gas turbine. The shut-off valve member is held by a likewise pre-tensioned scissor-type mechanism in the position in which it opens the fuel line. If a faulty gas turbine component acts on the scissor-type mechanism, the shut-off valve member is released and moves abruptly into the position in which it interrupts the fuel supply. The gas turbine is thus switched off safely and reliably in the event of failure of a component, for example the turbine shaft.

2 Claims, 1 Drawing Sheet

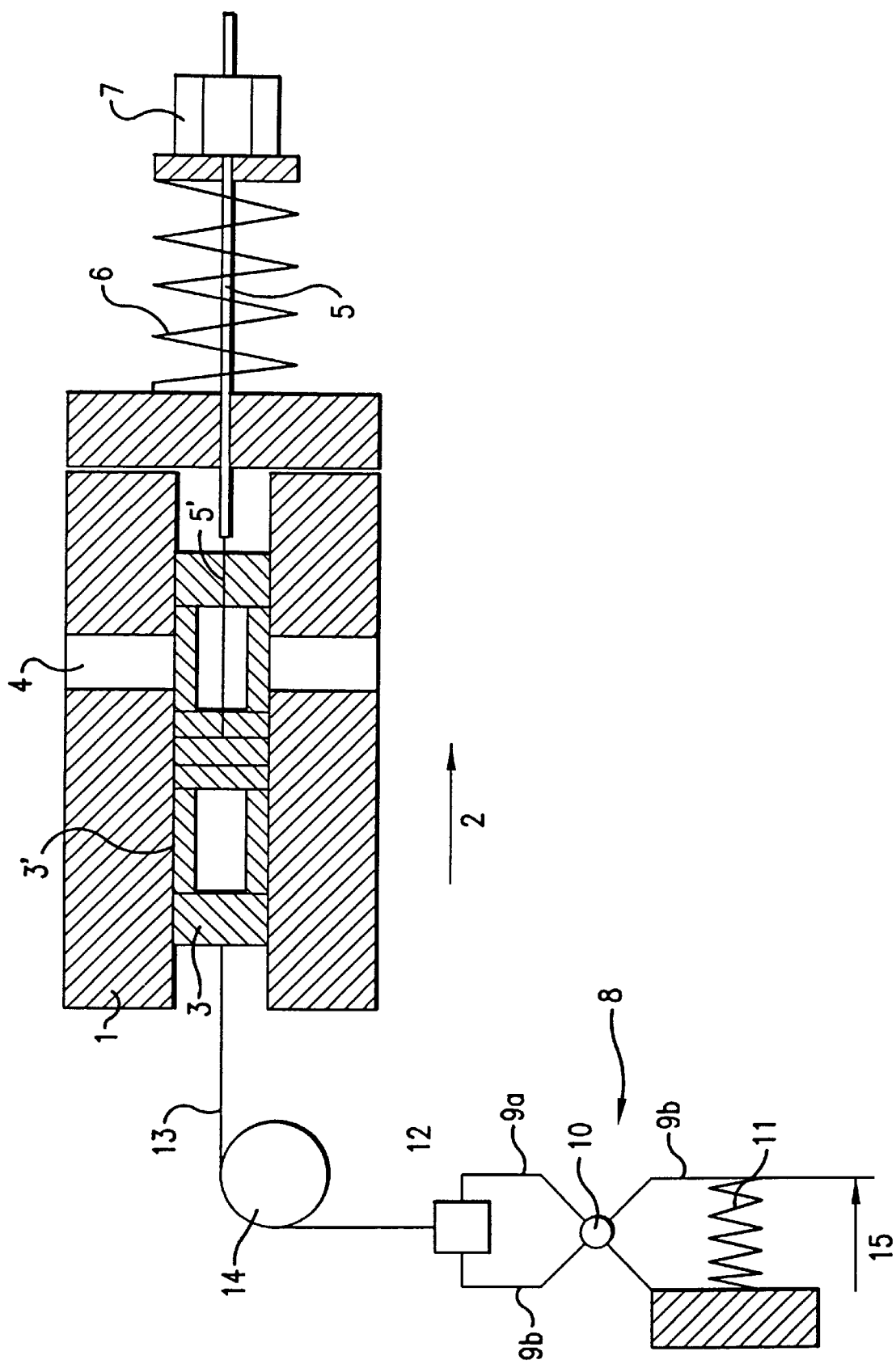

MECHANICAL FUEL SHUT-OFF SYSTEM FOR A GAS TURBINE

BACKGROUND AND SUMMARY OF THE INVENTION

The invention relates to a mechanical shut-off system in the fuel supply system of a gas turbine, having a shut-off valve body which, by means of a spring, can be brought into a position interrupting a fuel line. The system further has a mechanism which, in the normal operation of the gas turbine holds the shut-off valve body in a position releasing the fuel line and releases the shut-off valve body in the event of damage or breakage of a structural element of the gas turbine. Such a mechanically operated shut-off system which, for example, in the event of a breakage of a gas turbine shaft, abruptly interrupts the fuel supply system of the gas turbine, according to existing regulations, must be provided, for example, on a flight gas turbine, and is known from British Patent Document GB-A-903 945 or U.S. Patent Document U.S. Pat. No. 3,050,939.

It is sometimes difficult to arrange these known shut-off systems, such that on a gas turbine, in the event of all possible damage cases or breaks on important structural components of the gas turbine, a secure interruption of the fuel supply takes place. The reason is that the corresponding mechanism which releases the shut-off valve body in the event of damage must definitely be impacted by the broken or damaged component.

In view of the above, it is an object of the present invention to provide a simple and reliable mechanical shut-off system. For achieving this object, it is provided that the mechanism is constructed as a shear-type (scissor-type) mechanism acted upon by a spring, which shear-type mechanism comprises an arm which is constructed such that, in the event of damage or a break of a structural element of the gas turbine, it is acted upon so that it releases the shut-off valve body.

BRIEF DESCRIPTION OF THE DRAWING

The FIGURE is a schematic diagram of the mechanical shut-off system according to the present invention.

DETAILED DESCRIPTION OF THE DRAWING

Referring to the schematic diagram, reference number 1 indicates a housing in which a shut-off valve body 3 is guided in a longitudinally slidable manner according to the direction of the arrow 2. If this shut-off valve body 3 is in the illustrated position, a fuel line 4 which penetrates the housing 1 transversely to the direction of the arrow 2 is not interrupted whereas this fuel line 4 is interrupted when the shut-off valve body 3 has moved to the right and comes to rest with its center section 3' in the area of this fuel line 4-in this position, the shut-off valve body 3 is illustrated by thin lines. In the position of the shut-off valve body 3 illustrated by thick lines, fuel can therefore reach, by way of the fuel line 4, the combustion chamber of the gas turbine, which is not shown. In contrast, if the shut-off valve body 3 comes to rest farther on the right in the area of the fuel line 4, the fuel supply to the combustion chamber of the gas turbine is interrupted because the fuel line 4 will then be shut off.

By way of a traction rope 5' (cable) as well as an adjoining threaded rod 5, a pressure spring 6 (which is also supported on the housing 1) is applied to the shut-off valve body 3 and seeks to move the shut-off valve body 3 toward the right according to the direction of the arrow 2. In this case, the force of the pressure spring 6 can be preadjusted by using an adjusting nut 7 interacting with the threaded rod 5 so that, when there are no counterforces, the shut-off valve body 3 is brought into the position shutting-off/blocking the fuel line 4.

While the described pressure spring 6 is applied to the right side of the shut-off valve body 3, a shear-type mechanism is applied to the left side of the shut-off valve body 3. As a whole, the shear-type mechanism has the reference number 8. At first, the shear-type mechanism holds the shut-off valve body 3 in the position illustrated by thick lines. With respect to details, this shear-type mechanism 8 is formed by two arms 9a, 9b, in which case arm 9a is linked in a stationary manner and arm 9b can be swivelled about a hinge point 10. In this case, the swivellable arm 9b is prestressed by a tension spring 11 such that the two arms 9a, 9b are capable of holding a connection element 12 by means of their free ends. This connection element 12 is connected with the shut-off valve body 3 by means of a traction rope or cable 13 which is guided by way of a deflection pulley 14.

In the prestressed illustrated position, in which the fuel line 4 is not interrupted, the shut-off valve body 3 is therefore held by the shear-type mechanism 8. If now a structural element of the gas turbine which is situated close to the shears-type mechanism 8 (and which is not shown) suffers damage and is possibly even broken, this structural element will, for example, impact according to the arrow 15 on the swivellable arm 9b of the shears-type mechanism 8. This impact impulse of the destroyed structural element of the gas turbine is larger than the force of the tension spring 11 so that the shear-type mechanism opens and, in the process, the connection element 12 is released. This allows the pressure spring 6 to displace the shut-off valve body 3, as described above, into the position in the direction of the arrow 2 which interrupts the fuel line 4. In the event of the occurrence of damage, the fuel supply of the gas turbine can be abruptly and reliably interrupted in this manner. In the event of damage, the shear-type mechanism can naturally also be triggered in a different manner but always, in the widest sense by the damaged structural element, for example, the turbine shaft. Naturally, the present invention was explained only by means of a schematic diagram, constructive details may in this case definitely be designed to differ from the illustrated embodiment without leaving the content of the claims.

I claim:

1. A mechanical shut-off system for a fuel supply system of a gas turbine, comprising:

a shut-off valve body which is brought into a position interrupting a fuel line of the fuel supply system via a spring;

a mechanism which, in a normal operation of the gas turbine holds said shut-off valve body in a position opening said fuel line and which releases said shut-off valve body in an event of damage or breakage of a structural element of the gas turbine;

wherein said mechanism comprises a shear-type mechanism and a second spring which acts upon said shear-type mechanism, said shear-type mechanism comprising a first arm constructed such that it is acted upon so as to release said shut-off valve body in the event of damage or breakage of the structural element of the gas turbine.

2. The mechanical shut-off system according to claim 1, further comprising:

a connection element of said shut-off valve body;

a traction rope connecting said connection element with said shut-off valve body;

threaded rod having an adjusting nut which applies said first spring constructed as a pressure spring to said shut-off valve body;

wherein said shear-type mechanism further comprises a second arm which is stationarily disposed, said first arm being rotated about a hinge point, said first and second arms being applied to said connection element;

further wherein said second spring is provided on a side of said hinge point situated opposite said connection element and is constructed as a tension spring applied to the rotatable first arm of the shear-type mechanism such that, in an event of breakage of the structural element of the gas turbine, said structural element actuates said rotatable first arm against a direction of the tension spring force to release said connection element.

* * * * *